United States Patent [19]

Müller

[11] Patent Number: 4,775,138

[45] Date of Patent: Oct. 4, 1988

[54] DEVICE FOR LOADING AND UNLOADING X-RAY FILM CASSETTES

[75] Inventor: Jürgen Müller, Munich, Fed. Rep. of Germany

[73] Assignee: AGFA Gevaert Aktiengesellschaft, Leverkusen, Fed. Rep. of Germany

[21] Appl. No.: 29,533

[22] Filed: Mar. 23, 1987

[30] Foreign Application Priority Data

Mar. 29, 1986 [DE] Fed. Rep. of Germany ....... 3610659

[51] Int. Cl.$^4$ .............................................. B65H 3/44
[52] U.S. Cl. ......................................... 271/9; 271/90; 271/164; 414/411
[58] Field of Search ...................... 271/301, 5, 9, 162, 271/164, 90; 414/411

[56] References Cited

U.S. PATENT DOCUMENTS

| 4,049,142 | 9/1977 | Azzaroni | 414/411 X |
| 4,354,336 | 10/1982 | Azzaroni | 414/411 X |
| 4,480,423 | 11/1984 | Muller | 271/171 X |
| 4,496,273 | 1/1985 | Thate | 271/164 X |
| 4,539,794 | 9/1985 | Azzaroni | 414/411 X |
| 4,577,452 | 3/1986 | Hosel | 414/411 X |

FOREIGN PATENT DOCUMENTS 3232148 8/1982 Fed. Rep. of Germany .
2607876 3/1985 Fed. Rep. of Germany .

*Primary Examiner*—Richard A. Schacher
*Attorney, Agent, or Firm*—Michael J. Striker

[57] ABSTRACT

A device for loading and unloading an X-ray film cassette comprises a housing which has a light-proof closable compartment receiving a film cassette and provided with a sucker for removing a film from and inserting a new film into the cassette, a device for determining a format of the cassette being loaded and unloaded, and a plurality of compartments accommodating film dispensing magazines containing film stacks of different formats. The loading device further includes a control for controlling movements of the dispensing magazines and a drive arrangement provided for each of the compartments for moving an assigned dispensing magazine in an open position thereof from the respective compartment to a region of the transport rollers and back into the respective compartment.

11 Claims, 5 Drawing Sheets

DEVICE FOR LOADING AND UNLOADING X-RAY FILM CASSETTES

BACKGROUND OF THE INVENTION

The present invention relates to a device for loading and unloading X-ray film cassettes.

X-ray film cassette-loading-and-unloading devices of the type under discussion have a housing formed with a light-proof closable compartment which receives a cassette to be loaded with X-ray film sheets accommodated in stacks in film supply or dispensing magazines positioned one under the other in drawers or boxes of the device. Such a device further includes means for determining a format of the cassette being loaded, a control device for controlling the movement of the dispensing magazines, a device for removing film sheets from the dispensing magazines, and a device for transporting the film sheets from the dispensing magazines to the cassette.

Different versions of such loading and unloading devices have been known. In one of the version, the film dispensing magazines are opened in their drawers or compartments and the uppermost film sheet is lifted from the film stack in the respective magazine by a sucker positioned in the respective drawer and transmitted to the transport roller pair corresponding to that drawer. The transport plane of this roller pair extends parallel to the plane of the film stack in the dispensing magazine so that the film sheet being transported must be deflected. In the DE-PS No. 26 07 876, this deflection is carried out by a passage provided for each drawer or compartment accommodating a dispensing magazine. The manufacture of such passages is very expensive.

In further conventional devices, for example disclosed in DE-PS No. 32 32 148, such a deflection is performed by respective separate tracks of transport roller pairs. Thereby each deflection location represents danger that the film sheet being transported could be damaged.

SUMMARY OF THE INVENTION

It is an object of the present invention to provide an improved device for loading and unloading X-ray film cassettes.

It is another object of this invention to provide an X-ray cassette loading and unloading device in which a plurality of passages for deflecting the path of film sheets in their way to the film cassette would be avoided and only very few film transfer direction changes would be provided.

These and other objects of the invention are attained by a device for loading and unloading an X-ray film cassette, comprising a light-proof closable compartment receiving a film cassette being loaded and unloaded and provided with means for removing a film from and inserting a new film into the cassette; means for determining a format of the cassette being loaded and unloaded; a plurality of compartments accomodating film dispensing magazines containing film stacks of different formats; a control device for controlling a dispensing magazine the film format of which corresponds to that of said cassette and for removing a film sheet from said magazine; transport means for transporting the film sheet removed from said magazine to said cassette; and drive means provided for each of said compartments for moving an assigned dispensing magazine in an open position from the respective compartment to a region of said transport means and back into said respective compartment wherein only the drive means of the dispensing magazine containing the film stack of the format corresponding to that of said cassette is actuated by said control device when said magazine is unloaded.

Due to the device according to the present invention it is possible to ensure the movement of the required dispensing magazine into the region of the film transport track such that the film sheet separated from the film stack in the magazine would be guided substantially over the straight-line path.

At least one sucker may be provided, which is controlled by said control device and is applied thereby to an suppermost film sheet of the film stack contained in the dispensing magazine transported by said drive means from the respective compartment.

At least one sucker may be assigned to each dispensing magazine.

At least one common sucker may be provided for all dispensing magazines, said sucker being vertically adjustable by said control device.

Said sucker may be insertable into a respective dispensing magazine laterally from above.

The transport means may include a transport roller pair for transferring the film sheet lifted by said sucker to a further transport means leading towards said cassette, said transport roller pair being positioned above the dispensing magazine moved from the respective compartment and below a dispensing magazine superposing the magazine moved from respective compartment.

The transport means may include a plurality of transport roller pairs for different dispensing magazines, said transport roller pairs forming together a film sheet transport track.

Each dispensing magazine may include a container partially opened at an upper side thereof and a tubular slide cover which light-proof closes and locks an opening in said container, whereby said slide cover during a light-proof movement of said dispensing magazine back into said respective compartment is automatically locked and said container is movable relative to said cover in said respective compartment to release said opening, said drive means including a gripping device positionable against an end face of each dispensing magazine and displaceable in a direction of movement of said container out of the respective compartment, said gripping device being provided with an electric motor switchable by said control device, and transmission means for moving said gripping device back and forth in the direction to and from said transport means.

The transmission means may include a gear coupled to said motor and secured with said motor to said gripping device, a further gear operatively connected to said gear and a rack fastened to a compartment wall and engaged with said further gear.

Two such racks may be provided in an interior of the device at both longitudinal sides of the compartment accommodating said magazine and two further gear gears are provided, engaged with the respective racks.

The container may have a rib outwardly protruding from an end face of the container, said slide cover having a projection which forms with said rib a stop for a closed position of said dispensing magazine, said gripping device having a catching means which is brought into engagement with said rib when said magazine is in a partially open position.

The catching means may be formed by a detent which is spring-biased supported on said gripping device and which is resiliently locked with said rib upon the movement of said dispensing magazine out of the respective compartment and is movable from a locked position at a housing-fixed abutment surface upon the movement of said magazine in a reversed direction.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DETAILED DESCRIPTION OF THE PREFERRED EMBODIMENTS

Figure 1:
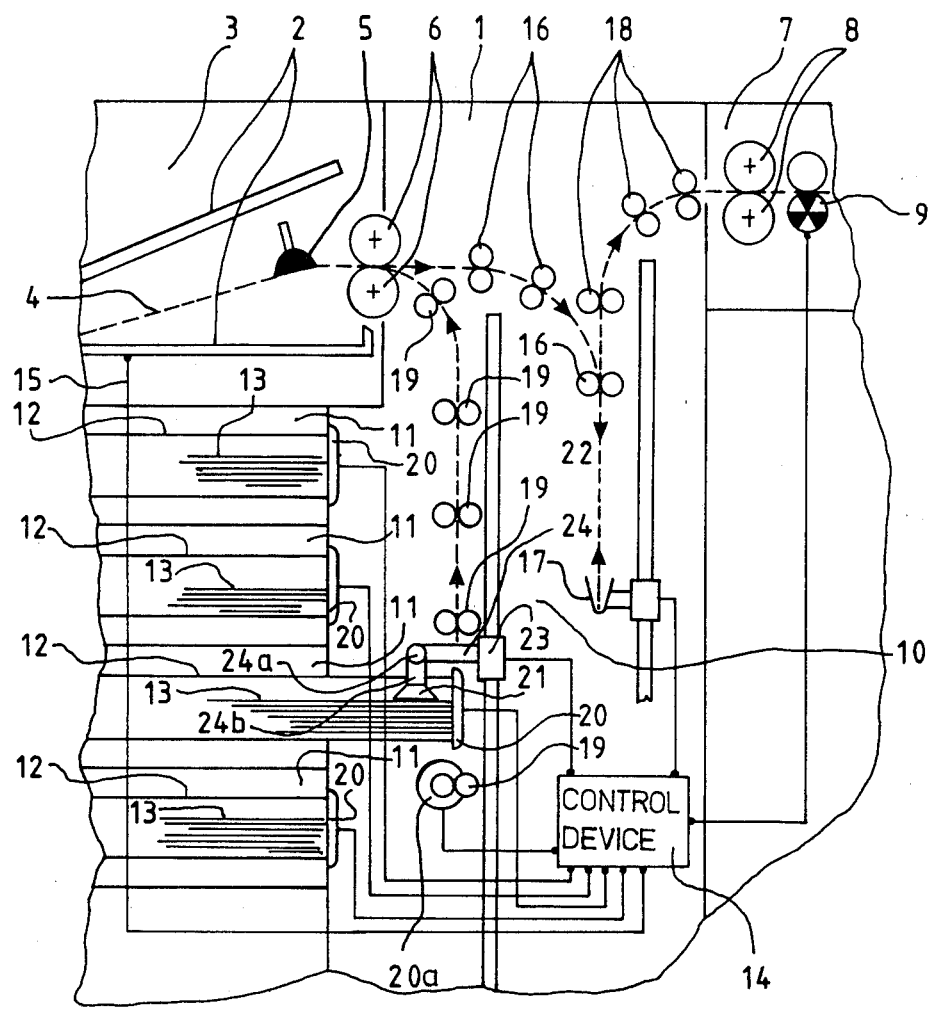
FIG. 1 is a schematic partial view of the X-ray film cassette with film dispensing magazines according to the invention.
Figure 3:
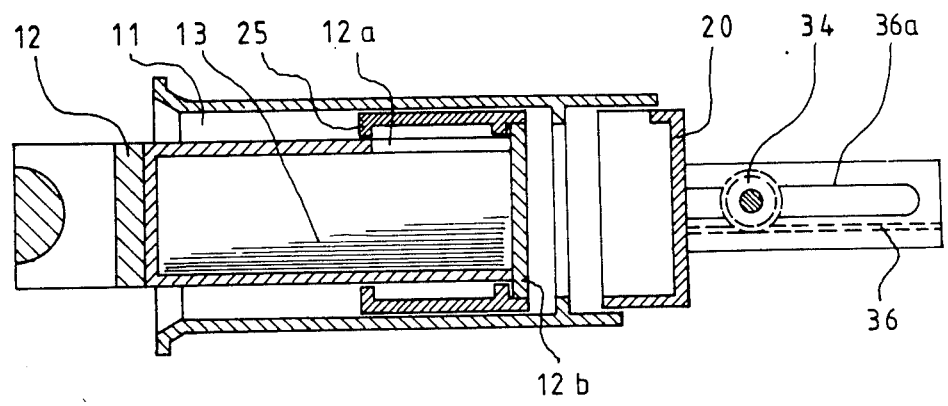
FIG. 3 is a sectional view of the magazine taken in a plane perpendicular to that of the section of FIG. 2.

Referring now to the drawings in detail reference numeral 1 in FIG. 1 designates a housing of the film cassette-unloading-and-loading device. Housing 1 has a light-proof closable compartment 3 for accommodating an X-ray film cassette 2 to be loaded or unloaded. Reference numeral 5 denotes a sucker for removing a film sheet 4 from the open cassette 2 positioned in the compartment 3. A transport roller pair 6 for further transporting the film sheet 4 is positioned at the end wall of compartment 3.

Between the compartment 3 and a film developing device 7 or an assigned film sheet transporting means 8 and a light barrier or switch 9 for controlling a film transport, is provided a vertical film sheet transport chute 10 into which drawers or compartments 11 for accommodating film supply-and-dispensing magazines 12 open. These film dispensing magazines 12 contain film sheet packs or stacks 13 of films of different formats and types. The size and the format of the films and the size and the format of the respective cassette are determined by a conventional and non-shown device, and the data produced by said device are fed to a computer or a comparator device or an electronic control device which is schematically shown and designated by reference numeral 14. The conventional size-determining device is designated by a conduit 15.

Three groups of roller pairs or film transport tracks are provided in the transport chute 10 before the roller pair 6. A curved roller track 16 leads to a collecting hook or cage 17 which is connected to the control device 14 and, after the determination of the cassette format, is moved to the level in which film sheet 4 transported by rollers 6, 16 is captured. The upper end of film sheet 4 yet remains between one of the roller pairs 16 so that it can be transported upwardly and towards the roller pair 8 of the non-shown film developing device through a roller track 18 when the light switch 9 of the control device 4 issues a signal for a free passage.

A third transport roller track 19, a drive 20a of which is connected to the control device 14, extends vertically in the transport chute 10 so that it faces the compartments 11 for the film dispensing magazines 12 whereby rollers 19 of each roller pair of the roller track 19 are always positioned between two magazines 12 so that the latter can be moved into the chute 10 between two roller pairs 19. A clamping or gripping device 20 is provided against each compartment 11 for each dispensing magazine 20. Each clamping device is also connected to the control device 14.

Each clamping or gripping device 20 is controlled by control device 14 so as to determine which device 20 should be operated in accordance with the type and format of the film contained in the respective dispensing magazine after the cassette 2 has been emptied. In the example shown in FIG. 1 this is the second lowermost magazine 12. This magazine is gripped by the clamping device 20, and by a drive not shown in FIG. 1, is pulled to a fully open position in the transport chute 10. In said open position of magazine 12, the uppermost film sheet is removed from the film dispensing magazine by a suitable means and is guided by the transport roller track 19 to the emptied cassette 2. The roller track 19 is promptly set into operation by means of the control device 14. After the removal of the film sheets the dispensing magazine drawn into transport chute 10 is returned to its compartment or drawer 11 by means of control device 14.

For the removal of a film sheet from the film dispensing magazine 12 moved to the ready-to-operate position in the transport chute 10, a sucker or a pair of suckers can be provided for each magazine. These suckers are set into operation also by the control device 14. In place of individual suckers a single suction device 21 can be provided which is pivotable and movable along a vertical guide 22 by a motor with a transmission 23 and which is also controlled by means of control device 14. After applying the suction device 21 to the uppermost film sheet of the respective stack 13 the suction device 21 is set into operation and lifts the film sheet from the magazine, then pivots by about 90° and moves the front edge of the film sheet to the roller pair 19 positioned against the open dispensing magazine 12. The film sheet being transmitted towards the cassette 2 is gripped by this roller pair 19 and conveyed by the transport track 19 to the empty cassette l2. Since the suction device 21 usually comprised of at least two suckers should not collide with the rollers 19 or the clamping device 20 and the upper edges of the dispensing magazine 12 it is expedient that the suction device 21 be supported on arms 24 provided laterally of the magazine 12 and including inwardly and downwardly extended parts 24a, 24b.

In the FIGS. 2 through 7, the possible embodiments of the film dispensing magazine 20 and the clamping device 20 and their cooperation in various positions are illustrated. Each film dispensing magazine is of a known construction and is formed by a container 12 having a grip. This container has, at the upper side thereof and adjacent its end face, an opening 12a which is sufficiently large to permit the insertion of the film stack 13 into the container and the removal of individual film sheets from the container. One end face of the container 12 has a protruding edge 12b. Opening 12a is closable and releasable by a slide cover 25. The slide cover 25 is preferably tubular and forms, in the closed position of the magazine 12, with the protruding edge or rib 12b a sealing against light and a stop. In the closed position of the magazine 12, the slide cover 25 (preferably at each narrow longitudinal side) engages one arm of a two-arm spring-biased lock or catch 26 positioned on the slide cover 25 in a locking recess 12c provided in the wall of the container 12 whereas the other arm of this catch is engaged in a hole 25a provided in the slide cover 25. A corresponding wall 27a of each compartment 11 has also a hole or perforation 27a which, in the position of the magazine 12, 25, in which it must be opened, is flush with the hole 25a. A spring-biased detent 28 extends through the perforation 27a. Detent 28 is sufficiently strong to pivot, upon the insertion of the catch 26 into the perforation 25a, against the action of its spring and unlock or release the slide cover 25 from the container 12. Thereby the slide cover 25 is then sealed against light at a compartment-side projection or stop 27b and is held thereby.

Figure 5:
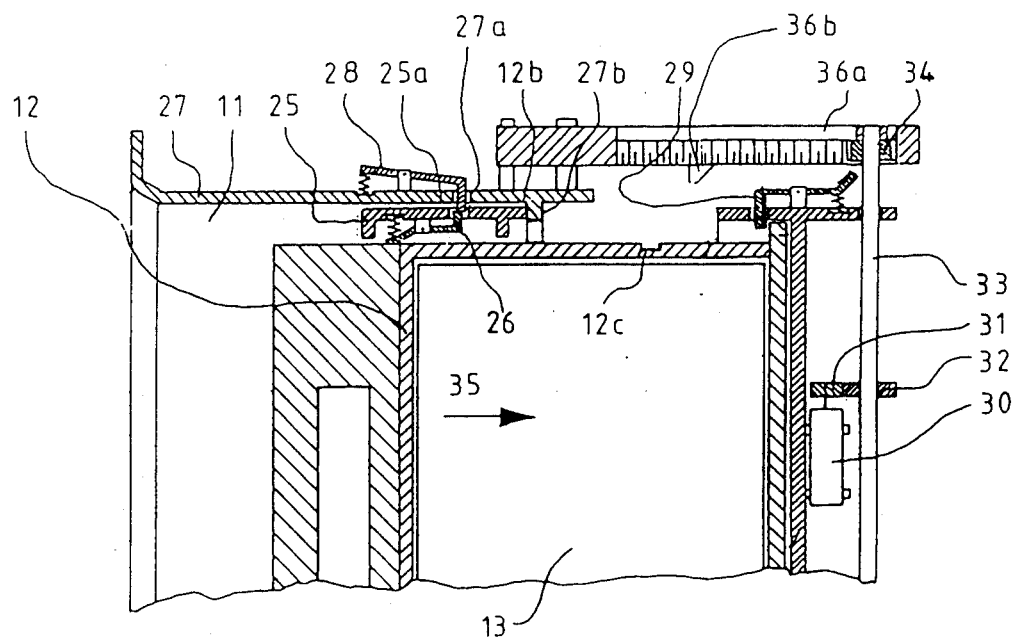
FIG. 5 is a sectional view of the film dispensing magazine in a fully open position.

Upon further insertion of the magazine 12, 25 the container 12 is further displaced until its protruding rib 12b is locked by means of at least one, preferably two-arm, spring-biased detent 29 provided on the front side of the clamping or gripping device 20 and engageable with the edge or rib 12b as shown in FIG. 5. An electric motor 30 is coupled with each clamping device 20. In the exemplified embodiment a pinion 31 of electric motor 30 is in mesh with a gear 32. The latter is secured to a rod 33 which is parallel to the end face of container 12. A further gear 34 is rotationally supported at each end of rod 33 These further gears 34 are each in mesh with a rack 36 which is parallel to the direction 35 of displacement of the magazine 12. Rod 33 is guided in a housing-fixed slot 36a which extends parallel to racks 36.

Figure 4:
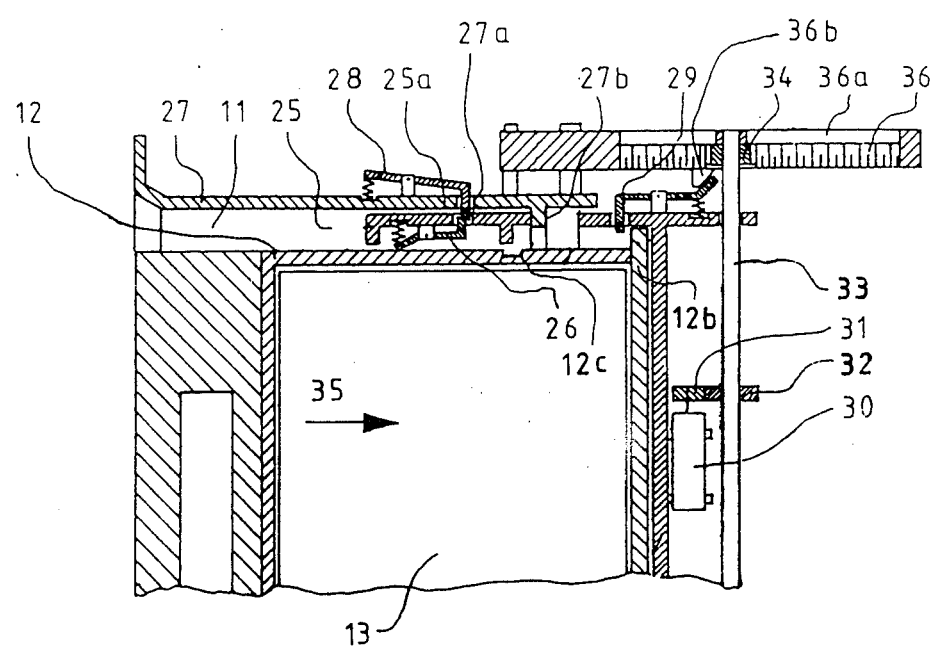
FIG. 4 is a sectional view similar to that of FIG. 3 in the position of opening of the film dispensing magazine.
Figure 6:
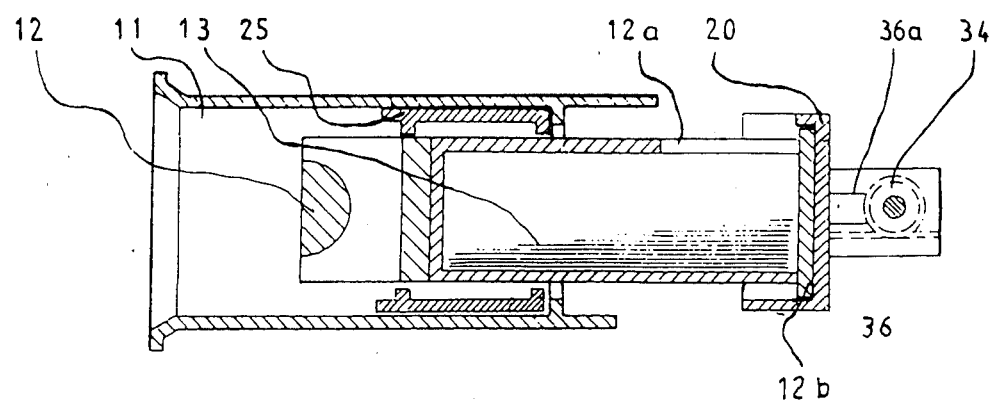
FIG. 6 is a sectional view similar to that of FIG. 3 of the film dispensing magazine in the fully open position.

If the compartment 11 of a respective magazine 12 or its clamping device 20 is controlled by control device 14 until the magazine is displaced to the position shown in FIG. 4 then gears 31, 32, 34 are driven by the motor 30 such that the clamping device 20 jointly with the container 12 is moved to the ready-to-operate position for the removal of a film sheet from the magazine into the transport chute 10 according to FIG. 1. This position is illustrated in FIGS. 5 and 6. After the removal of the film sheet from the stack contained in the magazine 12 the motor 30 is actuated by the control device 14 in a reversed direction and transports the container 12 in the direction counter to that shown by arrow 35 to the position according to FIG. 4.

Figure 2:
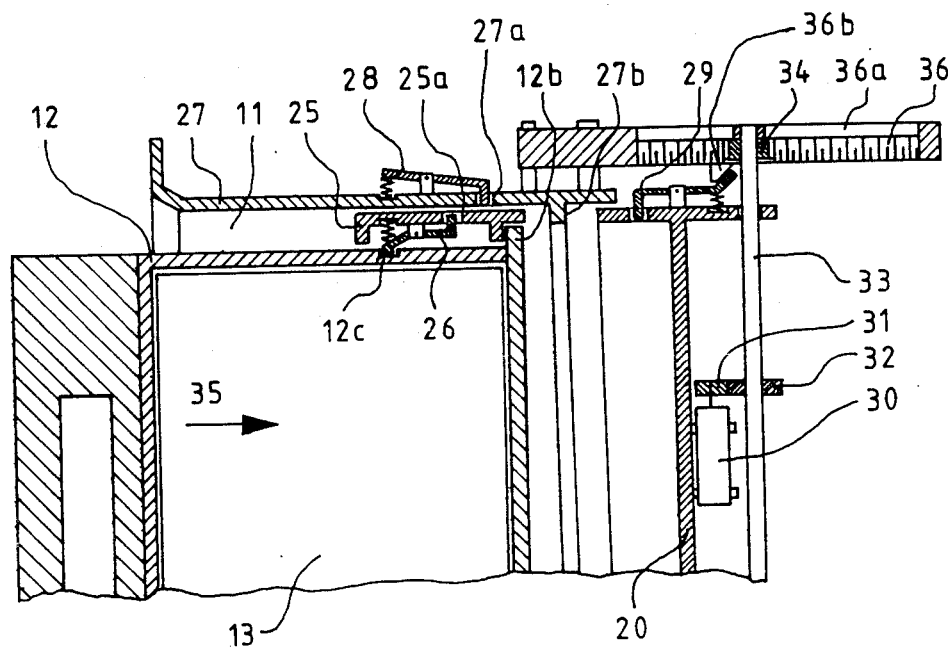
FIG. 2 is a sectional view through the part of the device of FIG. 1 which receives a film dispensing magazine.
Figure 7:
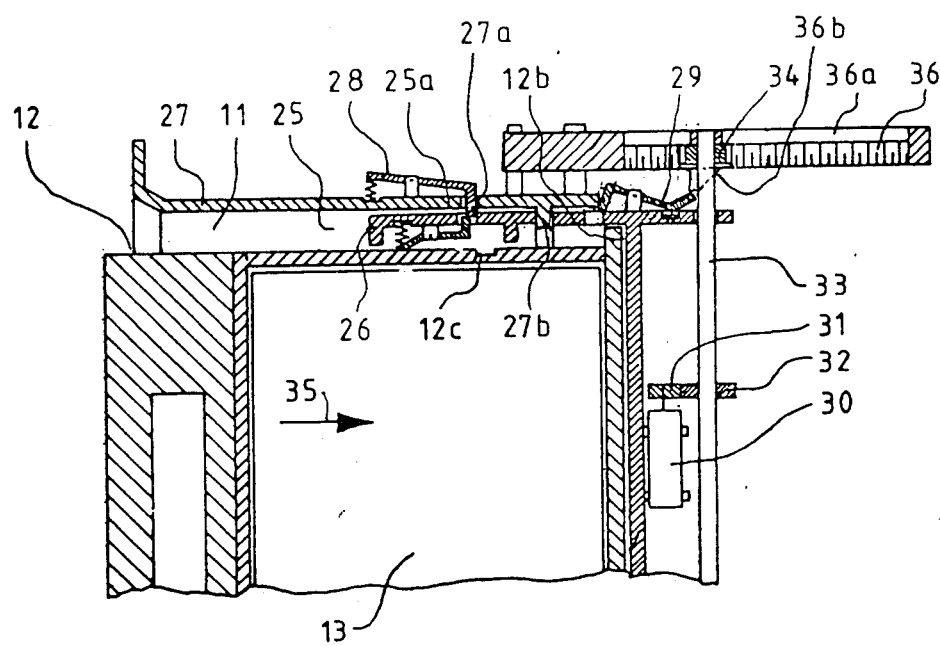
FIG. 7 is a sectional view similar to that of FIG. 2 of the film dispensing magazine during its closing.

Should a magazine be exchanged the container 12 is moved either by hand or, for example by a special motor-actuated key, to the position according to FIG. 7 or 2 in the direction counter to that of arrow 35 so that detent 29 provided at the housing-fixed inclined surface 36b becomes uncoupled from the container edg or rib 12b. Simultaneously, detent 28 is lifted, for example by a magnetic switch, so that it is no longer engaged in the hole 25a. Now the magazine 12 is pulled by hand from the compartment 11 whereby the edge or rib 12b is light-proof engaged on the slide cover 25 and the catch 26 of cover 25 is again locked with the recess 12c, and the magazine 12, 25 is locked also.

Other alternatives of the present invention are possible. For example, it is possible to support motors 30 housing-fixed and have drive toothed rods connected to the clamping devices 20 by pinions. Also, the locking and unlocking of detents or catches 26, 28, 29 can be performed in any other suitable manner.

It will be understood that each of the elements described above, or two or more together, may also find a useful application in other types of devices for loading and unloading X-ray film cassettes differing from the types described above.

While the invention has been illustrated and described as embodied in a device for loading and unloading X-ray film cassettes, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for loading and unloading an X-ray film cassatte, comprising a light-proof closable compartment receiving a film cassette being loaded and unloaded and provided with means for removing a film from and inserting a new film into the cassette; means for determining a format of the cassette being loaded and unloaded; a pluralaity of compartments accommodating film dispensing magazines containing film stacks of different formats; a control device for controlling a dispensing magazine the film format of which corresponds to that of said cassette and for removing a film sheet form said magazine; transport means for transporting the film sheet removed from said magazine to said cassette; and drive means (20, 30, 34, 36) provided for each of said compartments for moving an assigned dispensing magazine in an open position from the respective compartment to a region (10) of said transport means and back into said respective compartment wherein only the drive (20) of the dispensing magazine which contains the film stack of the format corresponding to that of said cassette is actuated by said control device each time when film sheets are to be removed from said dispensing magazine, each dispensing magazine including a container partially opened at an upper side thereof, and a tubular slide cover which light-proof closes and locks an opening in said container, whereby said slide cover during a light-proof movement of said dispensing magazine back into said respective compartment is automatically locked and said container is movable relative to said cover in said respective compartment to release said opening, said drive means (20) including a gripping device positionable against an end face of each dispensing magazine and displaceable in a direction of movement of said container out of the respective compartment, said gripping device being provided with an electric motor (30) switchable by said control device, and transmission means (31, 32, 33, 34, 36) for moving said gripping device back and forth in the direction to and from said transport means.

2. The device as defined in claim 1, wherein at least one sucker (21) is provided which is controlled by said control device and is applied thereby to an uppermost film sheet of the film stack contained in the dispensing magazine transported by said drive means from the respective compartment.

3. The device as defined in claim 2, wherein at least one sucker is assigned to each dispensing magazine.

4. The device as defined in claim 2, wherein at least one common sucker is provided for all dispensing magazines, said sucker being vertically adjustable by said control device.

5. The device as defined in claim 4, wherein said sucker is insertable into a respective dispensing magazine laterally from above.

6. The device as defined in claim 5, wherein said transport means includes a transport roller pair (19) for transferring the film sheet lifted by said sucker to a further transport means leading towards said cassette, said transport roller pair being positioned above the dispensing magazine moved from the respective compartment and below a dispensing magazine superposing the magazine moved from said respective compartment.

7. The device as defined in claim 6, wherein said transport means includes a plurality of transport roller pairs for different ones of said dispensing magazines, said transport roller pairs forming together a film sheet transport track.

8. The device as defined in claim 1, wherein said transmission means include a gear (31) coupled to said motor and secured with said motor to said gripping device, a further gear (34) operatively connected to said gear (31) and a rack (34) fastened to a compartment wall and engaged with said further gear.

9. The device as defined in claim 8, wherein two racks (36) are provided in an interior of the device at both longitudinal sides of the compartment accommodating said magazine and two further gear gears (34) are provided, engaged with the respective racks.

10. The device as defined in claim 9, wherein said container has a rib (12b) outwardly protruding from an end face of the container, said slide cover having a projection which forms with said rib a stop for a closed position of said dispensing magazine, said gripping device having a catching means (29) which is brought into engagement with said rib when said magazine is in a partially open position.

11. The device as defined in claim 10, wherein said catching means (29) is formed by a detent which is spring-biased supported on said gripping device and which is resiliently locked with said rib upon the movement of said dispensing magazine out of the respective compartment and is movable from a locked position at a housing-fixed abutment surface (36b) upon the movement of said magazine in a reversed direction.

* * * * *